US009228047B2

(12) United States Patent
Motta et al.

(10) Patent No.: US 9,228,047 B2
(45) Date of Patent: Jan. 5, 2016

(54) LOW DENSITY POLYURETHANE FOAMS

(75) Inventors: Bruno Cesar Silva Motta, Sao Paulo (BR); Venkat S. Minnikanti, Pearland, TX (US); Rogelio R. Gamboa, Brazoria, TX (US)

(73) Assignees: Dow Global Technologies LLC, Midland, MI (US); Dow Brasil Sudeste Industrial LTDA., Sao Paulo, SP (BR)

( * ) Notice: Subject to any disclaimer, the term of this patent is extended or adjusted under 35 U.S.C. 154(b) by 259 days.

(21) Appl. No.: 13/985,505

(22) PCT Filed: Feb. 13, 2012

(86) PCT No.: PCT/US2012/024865
§ 371 (c)(1),
(2), (4) Date: Aug. 14, 2013

(87) PCT Pub. No.: WO2012/112445
PCT Pub. Date: Aug. 23, 2012

(65) Prior Publication Data
US 2013/0331473 A1    Dec. 12, 2013

Related U.S. Application Data

(60) Provisional application No. 61/442,474, filed on Feb. 14, 2011.

(51) Int. Cl.
C08G 18/32    (2006.01)
C08G 18/18    (2006.01)
C08G 18/48    (2006.01)
C08G 18/76    (2006.01)
C08G 18/10    (2006.01)
C08G 101/00   (2006.01)

(52) U.S. Cl.
CPC ............ *C08G 18/3203* (2013.01); *C08G 18/10* (2013.01); *C08G 18/1875* (2013.01); *C08G 18/4816* (2013.01); *C08G 18/7664* (2013.01); C08G 2101/005 (2013.01); C08G 2101/0008 (2013.01); C08G 2101/0083 (2013.01)

(58) Field of Classification Search
CPC ............... C08G 18/3203; C08G 18/48; C08G 18/4816; C08G 18/7664; C08G 18/1875; C08G 2101/0008; C08G 2101/005; C08G 2101/0083
See application file for complete search history.

(56) References Cited

U.S. PATENT DOCUMENTS

| 5,478,494 A | 12/1995 | Lee et al. |
| 5,521,226 A | 5/1996 | Bleys |
| 5,621,016 A | 4/1997 | Murty et al. |
| 6,372,812 B1 | 4/2002 | Niederoest et al. |
| 6,420,448 B1 | 7/2002 | Hnatow et al. |
| 6,727,292 B2 | 4/2004 | Lockwood |
| 6,774,153 B2 | 8/2004 | Parfondry et al. |
| 2003/0087978 A1* | 5/2003 | Parfondry ............ C08G 18/409 521/155 |
| 2004/0034114 A1 | 2/2004 | Niederoest et al. |
| 2006/0293400 A1* | 12/2006 | Wiltz, Jr. et al. ............... 521/172 |
| 2008/0085945 A1* | 4/2008 | Sasaki ................ C08G 18/4072 521/174 |
| 2011/0319572 A1* | 12/2011 | Casati et al. ................... 525/408 |
| 2012/0178840 A1* | 7/2012 | Sasaki ....................... C08F 2/44 521/137 |
| 2012/0202908 A1* | 8/2012 | Sasaki et al. ................... 521/174 |
| 2012/0289619 A1* | 11/2012 | Battistini ............ C08G 18/4072 521/125 |

FOREIGN PATENT DOCUMENTS

| EP | 0976770 A1 | 2/2000 |
| JP | 5320308 | 12/1993 |
| JP | 7330850 | 12/1995 |
| JP | 2000080267 A | 3/2000 |
| JP | 2010126579 A | 6/2010 |
| WO | 9842763 A1 | 10/1998 |
| WO | 9907760 A2 | 2/1999 |
| WO | 0008083 A1 | 2/2000 |
| WO | 0073362 A2 | 12/2000 |
| WO | 0132736 A1 | 5/2001 |
| WO | 0188005 A2 | 11/2001 |
| WO | 0210245 A1 | 2/2002 |
| WO | 2007110286 A1 | 10/2007 |
| WO | 2008/021034 A2 | 2/2008 |
| WO | 2010072582 A2 | 7/2010 |
| WO | 2011042284 A2 | 4/2011 |

OTHER PUBLICATIONS

PCT/US2012/024865,International Search Report and Written Opinion of the International Searching Authority, Mailed May 8, 2012.
PCT/US2012/024865,International Preliminary Report on Patentability, Mailed Aug. 29, 2013.

* cited by examiner

*Primary Examiner* — John Cooney

(57) ABSTRACT

Embodiments of the invention provide for low density flexible polyurethane foams are reaction products of reaction systems including at least one polyol and at least one isocyanate including at least 50% by weight of an MDI based isocyanate. The flexible polyurethane foam has a density of less than about 33 kg/m$^3$ as determined according to ASTM D 3574-01, a tear strength of more than about 160 N/m as determined according to NBR 8515:2003 and a resiliency of at least 45% as measured according to ASTM D-3574-H.

12 Claims, No Drawings

LOW DENSITY POLYURETHANE FOAMS

FIELD OF THE INVENTION

Embodiments of the invention relate to polyurethane foams, more specifically to flexible polyurethane foams.

BACKGROUND OF THE INVENTION

Flexible polyurethane foams are well recognized articles of commerce. Flexible polyurethane foams are used in a wide variety of applications, ranging from cushioning (such as mattresses, pillows and seat cushions) to packaging to thermal insulation. Polyurethane foams are typically prepared by the reaction of a polyol component with an isocyanate, in the presence of a blowing agent, catalysts and other additives. Two commonly used isocyanates are TDI (toluene diisocyanate) and MDI (Methylene diphenyl diisocyanate) type isocyanates. Foams made using MDI based isocyanates are known to cure faster, thus resulting in a better density distribution, than foams made using TDI based isocyanates. A higher curing rate is particularly useful in discontinuous foaming processes where higher through put is required and when the foams are high (such as about two meters or higher). However, it is difficult to make low density (for example less than 33 kg/m$^3$) foams with MDI based isocyanates that have acceptable resiliencies and compression sets while also maintaining acceptable tensile strength, elongation to break, and tear strength without the use of any auxiliary blowing agent. There is a tradeoff that is typically observed between the mechanical properties of tensile strength, tear strength, elongation to break on one side with resiliency and compression set on the other side. Furthermore, such low density flexible foams may have uneven density distributions at various heights of the foams.

Therefore, there is a need for low density polyurethane flexible foams which have acceptable density distributions and acceptable balances between the mechanical properties of tensile strength, tear strength, elongation to break on one side with resiliency and compression set on the other side.

SUMMARY OF THE INVENTION

Embodiments of the invention include low density polyurethane flexible foams which have acceptable density distributions and acceptable balances between the mechanical properties of tensile strength, tear strength, elongation to break on one side with resiliency and compression set on the other side.

Embodiments of the invention include polyurethane foams which include the reaction product of a reaction system, in which the reaction system includes at least one polyol and at least one isocyanate including at least 50% by weight of an MDI based isocyanate. The flexible polyurethane foam has a density of less than about 33 kg/m$^3$ as determined according to ASTM D 3574-01, a tear strength of more than about 160 N/m as determined according to NBR 8515:2003 and a resiliency of at least 45% as measured according to ASTM D-3574-H Ball Rebound. The density may be less than about 26, 27, 28, 29, 30, 31 32, 33, 34, or 35 kg/m$^3$. The tear strength may be more than about 166, 170, 173, 180, 190, 200, 205, 210, 212, 220, 230, 240, 249, 250, 260, 270, 280, 290, 300, 310, 320, 330, 340, 350, 360, 368, 370, or 376 N/m. 45, The resiliency may be at least 46, 47, 49, 50, 51, 52, 53, 55, 56, 57, 58, 60, 61, 62, or 65%.

Embodiments of the invention include polyurethane foams which are the reaction product of a reaction system, where the reaction system includes:
- at least one isocyanate component wherein at least 50% by weight of the isocyanate component comprises an MDI based isocyanate;
- at least one first polyether polyol having an equivalent weight of about 1000-2500, a combined nominal functionality of about 3 to about 6; and
- at least one second polyether polyol having an equivalent weight of about 1400-2000, a combined nominal functionality of about 2 to about 7.2;
- wherein the flexible polyurethane foam has a density of less than about 33 kg/m3 as determined according to ASTM D 3574-01

Embodiments include the foams described above having a tear strength of more than about 160 N/m as determined according to NBR 8515:2003 and a resiliency of at least 45% as measured according to ASTM D-3574-H Ball Rebound %. The density may be less than about 26, 27, 28, 29, 30, 31 32, 33, 34, or 35 kg/m$^3$. The tear strength may be more than about 166, 170, 173, 180, 190, 200, 205, 210, 212, 220, 230, 240, 249, 250, 260, 270, 280, 290, 300, 310, 320, 330, 340, 350, 360, 368, 370, or 376 N/m. 45, The resiliency may be at least 46, 47, 49, 50, 51, 52, 53, 55, 56, 57, 58, 60, 61, 62, or 65%.

Embodiments include the foams described above having a 90% compression set of less than about 3, 4, 5, 6, 7, 8, 9, 10, 11, 12, or 13% as determined by ASTM D 3574-03.

Embodiments include the foams described above having an elongation to break of more than about 120, 125, 130, 132, 140, 150, 156, 160, 168, 170, 180, 185, 188, 190, 195, 200, 205, 208, or 210% as determined according to NBR 8515:2003.

Embodiments include the foams described above having a tensile strength of more than about 34, 35, 40, 45, 50, 55, 60, 70, 78, 80, 85, 90, 95, 97, 100, 105, 109, 110, 115, 120, or 125 kPa as determined according to NBR 8515:2003.

Embodiments include the foams described above having in density per height meter of less than about 2 kg/m3.

Embodiments include the foams described above where the reaction system further includes at least one of a delayed action gel catalyst and a delayed action blowing catalyst.

Embodiments include the foams described above where the reaction system further includes at least one delayed action gel catalyst and at least one delayed action blowing catalyst.

Embodiments include the foams described above where the MDI based isocyanate includes a mixture of 4,4'- and 2,4'-methylene diphenylisocyanate in weight ratios from 98:2 to 60:40.

Embodiments include the foams described above where the MDI based isocyanate includes an admixture of polymeric polymethylene polyphenyl-iisocyanate and 4,4'- and 2,4'-methylene diphenylisocyanate.

Embodiments include the foams described above where the MDI based isocyanate comprises at least one isocyanate-terminated prepolymer that is obtained by reacting MDI with at least one polyoxyalkylene polyol having an average nominal functionality from about 2 to about 4.

Embodiments include the foams described above where the first polyol includes a polyoxyethylene capped polyoxypropylene polyol capped at a percentage of about 10-20%, and comprises 50-99 weight % based on the total amounts by weight of polyols used.

Embodiments include the foams described above where the second polyol includes a polyoxyethylene/polyoxypropylene capped polyoxypropylene, a polyoxyethylene percentage around 60-85, and comprises 1-30 weight % based on the total amounts by weight of polyols used.

Embodiments include the foams described above where the second polyol includes a polybutylene oxide polyether.

DESCRIPTION OF EMBODIMENTS OF THE INVENTION

Embodiments of the present invention provide for low density polyurethane flexible foams which have narrow density distributions within the flexible foam and have acceptable balances between the mechanical properties of tensile strength, tear strength, elongation at break on one side with resiliency and compression set on the other side. These low density polyurethane flexible foams may be made by reacting at least one polyol with at least one isocyanate. Embodiments encompass the at least one isocyanate being an MDI based isocyanate. Embodiments also may encompass the at least one isocyanate and the at least one polyol being reacted in the presence of at least one delayed action catalyst.

Polyols are well known in the art and include those described herein and any other commercially available polyol. The polyols generally have an average functionality ranging from 2 to 8, a number average molecular weight of 100 to 10,000, such as 200 to 7,000, an average hydroxyl number ranging from 20 to 400 mg KOH/g, such as from 20 to 100 mgKOH/g. Mixtures of one or more polyols and/or one or more copolymer polyols may also be used to produce the low density polyurethane foams according to the embodiments of the invention.

Representative polyols include polyether polyols, polyester polyols, polyhydroxy-terminated acetal resins, hydroxyl-terminated amines and polyamines. Examples of these and other suitable isocyanate-reactive materials are described more fully in for example U.S. Pat. No. 4,394,491. Alternative polyols that may be used include polyalkylene carbonate-based polyols and polyphosphate-based polyols.

Embodiments encompass polyether polyols prepared by adding an alkylene oxide, such as ethylene oxide, propylene oxide, butylene oxide, or a combination thereof, to an initiator having from 2 to 8 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate.

The initiators for the production of the polyols may have 2 to 8 functional groups that will react with alkylene oxides. Examples of suitable initiator molecules are water, organic dicarboxylic acids, such as succinic acid, adipic acid, phthalic acid and terephthalic acid and polyhydric, in particular dihydric to pentahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing a tertiary amine such as ethanoldiamine, triethanoldiamine, and various isomers of toluene diamine.

Embodiments may encompass amine initiated polyols which are initiated with an alkyl amine as given by the formula below or containing an alkyl amine as part of the polyol chain.

$H_m A\text{-}(CH_2)_n\text{---}N(R)\text{---}(CH_2)_p\text{-}AH_m$ where n and p are independently integers from 2 to 6, A at each occurrence is independently oxygen or hydrogen, m is equal to 1 when A is oxygen and is 2 when A is nitrogen.

In one embodiment, the at least one polyol includes at least one of a polyoxyethylene capped polyoxypropylene polyol having an equivalent weight about 1000-2500. Such polyols may have a combined nominal functionality of about 3-6. In some embodiments the polyols may be initiated with a blend of glycerol and sucrose. The polyols may be polyoxyethylene capped at a percentage of about 10-20%. Examples of such polyols are SPECFLEX NC630, SPECFLEX NC 632, VORALUX HF 505, and VORANOL CP 6001, all available from The Dow Chemical Company. Embodiments include using a mixture of different embodiments of these polyols. These polyols, or mixture of polyols, may be included in a blend of polyols such that they are present in the blend at a 50-99 weight % ratio based on the total amounts by weight of polyols in the blend. All individual values and subranges between 50% and 95% are included herein and disclosed herein; for example, the polyols may be present in the blend from a lower limit of 50, 60, 70, or 80%, to an upper limit of 60, 70, 80, 85, 90, 95, or 99%.

The polyol blend may also include at least one polyoxyethylene/polyoxypropylene capped polyoxypropylene polyol having an equivalent weight of about 1400-2000, a combined nominal functionality of between about 2 and 7.2, and a polyoxyethylene percentage around 60-85. Such polyols are available from The Dow Chemical Company. Embodiments include using a mixture of different embodiments of these polyols. These polyols may be included in a blend of polyols such that they are present in the blend at a 0-30 weight % ratio based on the total amounts by weight of polyols in the blend. All individual values and subranges between 0% and 30% are included herein and disclosed herein; for example, the polyols may be present in the blend from a lower limit of 0, 1, 2, 3, 4, 5, 6, 7, 8, 10, 12, 15, 17, 19, or 20%, to an upper limit of 5, 6, 7, 8, 10, 12, 15, 17, 19, or 20, 25, or 30%.

The polyol blend may alternatively include at least one polybutylene oxide polyether made by combining an initiator and butylene oxide in the presence of a basic catalyst as described in U.S. Pat. No. 5,600,019. A block polymer is then prepared by combining the polybutylene oxide with ethylene oxide in the presence of a basic catalyst to form an ethylene oxide/butylene oxide block polyether. In another embodiment, polybutylene oxide polyether can be prepared by first forming a polyethylene oxide polyether and then forming a block polymer by combining the polyethylene oxide with butylene oxide in the presence of a basic catalyst. Block polymers are useful for forming polyethers having comparatively lower molecular weights, but it can be desirable to introduce some level of randomness for forming polyethers having molecular weights of greater than about 2,000. For example, in another embodiment, a polybutylene oxide polyether can be prepared by first forming a polybutylene oxide as described above, and then combining the polybutylene oxide with a mixed feed of ethylene oxide and butylene oxide in the presence of a basic catalyst.

The polybutylene oxide polyether may have a nominal functionality of from about 1 to about 8. While the polybutylene oxide polyether can be prepared in any way known to be useful for preparing polyethers, they are typically prepared by combining an initiator with an alkylene oxide in the presence of a basic catalyst. For example, methanol can be used as an initiator to prepare a surfactant having a nominal functionality of 1. Sucrose can be used to prepare a polybutylene oxide polyether having a nominal functionality as high as 8. Mixtures of initiators can also be used.

Additional polyols may include poly(propylene oxide) random copolymers of propylene oxide and up to 20% by weight ethylene oxide, having a functionality of from 2 to 4 and an equivalent weight of 800 to 2200;

Additional polyols may include polymer polyols containing polyols having an equivalent weight of 500 or greater and a disperse polymer phase. The disperse polymer phase may be particles of an ethylenically unsaturated monomer (of which styrene, acrylonitrile and styrene-acrylonitrile copolymers are of particular interest), polyurea particles, or polyurethane particles. The disperse phase may constitute from 5 to 60% by weight of the copolymer polyol;

To make a low density flexible foam, mixtures of one or more polyols may be reacted with at least one isocyanate. The amount of isocyanate that is used typically is sufficient to provide an isocyanate index of from 65 to 110. In another embodiment the index is from 70 to 100 and in a further embodiment from 75 to 90.

The at least one isocyanate may include at least one MDI based isocyanate. The at least one MDI based isocyanate may constitute at least 50, 55, 60, 70, 80, 90, 95, or 100 weight % of the total weight of isocyanate used. The at least one MDI based isocyanate may include methylene diphenylisocyanate (MDI) and/or an isocyanate-terminated prepolymer thereof having an isocyanate content of at least 6 weight percent. MDI may include the isomers 4,4'- and 2,4'-methylene diphenylisocyanate in weight ratios such as from 98:2 to 60:40, from 98:2 to 68:32, from 95:5 to 70:30, or from 90:10 to 70:30. The balance of the isocyanate mixture when not 4,4'- and 2,4'-methylene diphenylisocyanate can include 2,2'-methylene diphenylisocyanate, toluene diisocyanate, hexamethylene diisocyanate, isophorone diisocyanate, polymethylene polyphenylisocyanate, carbodiimide or allophonate or uretonimine adducts of methylene diphenylisocyanate and mixtures thereof.

The 4,4'- and 2,4'-MDI isomers may also be used in admixture with polymeric polymethylene polyphenylisocyanate (polymeric MDI). In one embodiment, the polymeric MDI includes 40, 50, 60, or 70 wt. % or more of the total MDI isocyanate. Especially suitable polymeric MDI products have a free MDI content of from 5 to 50% by weight, 10 to 40% by weight, or 10 to 30% by weight. Such polymeric MDI products are available from The Dow Chemical Company under the trade names PAPI and VORANATE. Embodiments include polymeric MDI products having an average isocyanate functionality of from 2 to 3.3 isocyanate groups/molecule and an isocyanate equivalent weight from 120 to 170, or from 125 to 135. Suitable commercially available products of that type include PAPI PB-219, PAPI 27, VORANATE M229, VORANATE 220, VORANATE 290, VORANATE M595 and VORANATE M600, all of which are available from The Dow Chemical Company.

Isocyanate-terminated prepolymers of MDI may be obtained by reacting the at least one isocyanate with at least one polyether polyol, present in a substoichiometric amount, to provide the resulting adduct with an isocyanate content of from 6, 8, 10, 15, 20, 25, or 28, and to 28, 30, or 31 or weight percent.

Examples of suitable embodiments of such isocyanate-terminated prepolymers are disclosed in U.S. Pat. No. 5,114,989 and exemplified by, for example, the urethane-modified polyisocyanate designated as SPECFLEX NE 134 available from The Dow Chemical Company. The polyoxyalkylene polyol used in the preparation of the prepolymer has an average functionality of from about 2 to about 4, from about 2 to about 3. By "average functionality" it is understood the number of isocyanate reactive sites per molecule, in the case of polyols, hydroxyl groups, capable of reacting with isocyanate groups. The polyoxyalkylene polyol is further characterized in that it has a hydroxyl equivalent weight of from about 2200 to about 3500 and containing oxyethylene residues in from about 40 to about 68 percent by weight. The hydroxyl equivalent weight of the polyol may be from about 2300 or 2400 and up to about 3200 or 2800.

The oxyethylene residue content of the polyol may be from about 55, from about 58 or from about 60 percent by weight, up to about 64 or about 65 percent by weight. The distribution of the oxyethylene residues within the polyol may be as one or a plurality of blocks either internally or terminally situated on the polyoxyalkylene chain, or alternatively in a random manner throughout the polyoxyalkylene chain of the polyol, or combinations thereof. The remaining part of the polyoxyalkylene chain when not constituted by oxyethylene residues comprises oxypropylene, oxybutylene residues or mixtures thereof, but especially of oxypropylene residues. Such residues being obtained from reaction of propylene oxide, and butylene oxide respectively. Residues from other oxides may also be present.

Embodiments encompass isocyanate-terminated prepolymers obtained using isocyanate blends that include 4,4'-MDI and 2,4'-MDI in a 70:30 weight ratio with a crude methylene diphenyldiisocyanate composition such as, for example, VORANATE* M220 available from the Dow Chemical Company, and containing polymethylene polyphenyl polyisocyanate (approximately 57.5 weight percent), 4,4'-MDI (40 wt. %) and 2,4'-MDI (2.5 wt. %). Combining the 70:30, 4,4'-/2,4'-MDI blend with VORANATE M220 in for example a 60:40 weight ratio provides a prepolymer consisting essentially of 4,4'-MDI (about 58%), 2,4' (about 19%) and polymethylene polyphenyl polyisocyanate (about 23%).

In one embodiment, the polyoxyalkylene polyol may be reacted with the least one MDI based isocyanate to provide a prepolymer which subsequently may be blended with like or other isocyanates including crude methylene diphenyldiisocyanate.

When preparing the prepolymer, the relative amount of polyoxyalkylene polyol to polyisocyanate is such to provide for a resulting prepolymer having the above mentioned isocyanate content. When preparing the prepolymer the above described polyoxyalkylene polyol optionally may also be used in combination with other isocyanate reactive substances conventionally used in the preparation of isocyanate-terminated prepolymers. Such conventional substances include for example ethylene glycol, propylene glycol, higher oxyalkylene adducts thereof and other polyether polyols not falling within the above description of the polyoxyalkylene polyol.

The prepolymer may be prepared by using conditions that have been described in the prior art for such preparations. Typically, the prepolymer can be prepared by the controlled addition of the polyol to the isocyanate whilst continuously mixing. The rate of addition of the polyol to the isocyanate advantageously is such so as to maintain, if necessary with heating or cooling, a reaction temperature of from about 45° to about 90° or from about 60° to about 80° C.

Embodiments also encompass prepolymers made as described in U.S. Patent Application Publication No. 2006/0142529. The prepolymer may be the reaction product of a polyether polyol with a stoichiometric excess of the at least one isocyanate.

The polyether polyol composition used to prepare the prepolymer may include one or more polyether polyols and has an average nominal hydroxyl functionality of from 1.6 to 8, a molecular weight of from 1000 to 12000 and having at least 30 percent, at least 40 percent, at least 50 percent, or at least 65 percent by weight of oxyethylene groups. In one embodiment, the polyol composition has a nominal functionality of from 1.6 to 6, from 1.6 to 4, or from 1.6 to 2.5. Similarly, the molecular weight for the polyol composition may be from 1000 to 8000, from 1000 to 5000, and or from 1500 to 3500. Combinations of polyether polyols, including monohydroxyl substances and low molecular weight diol and triol substances or amines, of varying functionality and oxyethylene content can be used but then in this event the average functionality, molecular weight and oxyethylene content of such combination will be as mentioned above. It is also to advantage that the oxyethylene content of the individual polyols be randomly distributed through out the molecule. The polyether polyol composition used to prepare the prepolymer may be a polyether polyol having a nominal hydroxyl functionality of from 1.6 to 2.5, a molecular weight of from 1500 to 3500 and having at least 65 percent by weight of oxyethylene groups.

To make a low density flexible foam, mixtures of one or more polyols may be reacted with the at least one isocyanate in the presence of at least one delayed action catalyst in order to obtain a balance between the reaction of the isocyanate and the polyol (gelling) and the reaction of the isocyanate with water (blowing) in order to produce a low density flexible polyurethane foam in which the cells are relatively uniform and the foam has acceptable mechanical properties. As used herein, the expression"delayed action catalysts" is intended to refer to catalysts that display the desirable property of having a slow start followed by increased activity. That is, a delayed action catalyst will exhibit a low activity at first followed by increased activity at a later time. Catalysts exhibiting high catalytic activity following activation may be useful.

The at least one delayed action catalyst may be a delayed action gel catalysts or a delayed action blowing catalyst. Embodiments also encompass the at least one delayed action catalyst including both at least one delayed action gel catalyst and at least one delayed action blowing catalyst.

To provide a time delay feature to the catalysts employed in the embodiments of the invention, some of the catalysts may be blocked with an organic carboxylic acid, or a phenol. By a "blocked" catalyst compound or tertiary amine compound is meant that the compound may be blocked with the organic carboxylic acid or phenol prior to admixture with the polyol component or the compound may be blocked within the polyol component by virtue of mixing and initially unblocked compound with the polyol component along with an organic carboxylic acid effectively resulting in an organic carboxylic acid blocked compound. By an "unblocked" catalyst or tertiary amine is meant that prior to adding the catalyst compound to the polyol component, it is not blocked with a carboxylic acid because its molecular structure provides the time delay required without the necessity for blocking with an organic carboxylic acid. Examples of delayed action catalysts are described in U.S. Pat. No. 5,478,494.

The delayed action blowing catalysts used in the invention may be carboxylic acid blocked tertiary amines, such as for example carboxylic acid blocked tertiary amine ethers. These delayed action blowing catalysts may be thermally activated by the heat of the exotherm reaction of the isocyanate with polyol. Tertiary amine portions of the delayed action blow catalyst have the general formula:

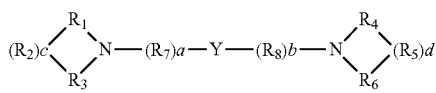

wherein $R_1$, $R_3$, $R_4$, and $R_6$ are each independently branched or preferably unbranched $C_1$-$C_5$ alkyl radicals when the corresponding c or d equals zero, such as methyl or ethyl radicals, and R1, $R_3$, $R_4$, and $R_6$ are each independently a methylene group when the corresponding c or d is greater than zero; $R_2$ and $R_5$ are branched or unbranched methylene groups, containing an ether; $R_7$ and $R_8$ are each independently branched or unbranched methylene groups; Y is oxygen, or

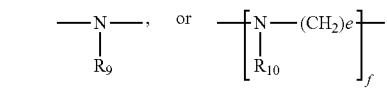

$R_9$ and $R_{10}$ are each independently a $C_1$-$C_5$ radical, such as a methyl or an ethyl radical; a and b are each independently an integer from 1 to 6, such as 1 to 2; c and d are each independently an integer from 0 to 6; e is an integer from 2 to 4; and f is an integer from 1 to 3.

Specific examples of tertiary amine blowing catalysts include one or more of N,N,N,N'''-tetramethyl-2,2'-diaminodiethyl ether; N,N,N',N'',N'' pentamethyl diethyl triamine; N,N,N',N'',N''',N'''',N'''' hydromethyl tetraethyl pentamine; N,N,N',N'',N'' pentamethyl dipropylene triamine, 2 dimethylaminoethyl-1,3-dimethylaminopropyl ether; and N,N-dimorpholinoethyl ether.

Suitable organic carboxylic acids used to block the tertiary amine blowing catalyst and delayed action gel catalysts include mono- or dicarboxylic acids having 1-20 carbon atoms, such as formic, acetic, propionic, butyric, caproic, 2-ethyl-hexanoic, caprylic, cyanoacetic, pyruvic, benzoic, oxalic, malonic, succinic, and maleic acids. The organic acid blocked tertiary amine blowing catalysts may be dissolved in water or organic solvents to avoid separation of the salt as crystals and the resultant phase separation. Suitable organic solvents include polyols having 2 to 4 hydroxyl groups in the molecule, such as ethylene glycol, diethylene glycol, propylene glycol, dipropylene glycol, butanediols, 2,6-hexanediol and glycerine. Among the cited compounds most frequently used are ethylene glycol, diethylene glycol, propylene glycol, dipropylene glycol and 1,4-butanediol.

The tertiary amine blowing catalysts may be blocked completely or partially with an organic carboxylic acid to yield a respective, fully blocked tertiary amine salt of the organic carboxylic acid or a partial salt of the organic carboxylic acid. The amount of organic carboxylic acid reacted with the tertiary amine blowing catalyst depends upon the degree to which one desires to delay the tertiary amine catalytic activity.

Examples of delayed action blowing catalysts include DABCO BL-17 catalyst based on bis(N,N-dimethylaminoethyl)ether (available from Air Products and Chemicals, Inc), and NIAX A-400 (available from Momentive Performance Materials).

The delayed action gel catalyst is designed to increase the reaction rate between the polyols and isocyanate and promote dimensional stability. Unlike the delayed action blow catalyst which may be blocked with a carboxylic acid to provide its time delay properties, the delayed action gel catalyst may, depending upon the structure, be blocked or unblocked and still provide time delay Suitable delayed action gel catalysts are any tertiary amine catalysts known in the polyurethane art to have time delay properties, including alicyclic tertiary amines and aliphatic tertiary amines. Unblocked aliphatic tertiary amines with the following general formula are well adapted for use in the invention as a delayed action gel catalyst:

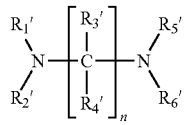

wherein $R_1'$, $R_2'$, $R_5'$, and $R_6'$ are each independently a $C_1$-$C_5$ branched or unbranched alkyl radical, preferably methyl or ethyl radical, optionally substituted with a hydroxyl group. $R_3'$ and $R_4'$ are each independently hydrogen or $C_1$-$C_3$ alkyl radicals, preferably hydrogen; and n is an integer from 4 to 10, preferably 6 to 8.

Examples of unblocked aliphatic gel catalyst are N,N,N',N' tetramethyl hexamethylene diamine and N,N' dimethyl-N,N'-diisopropyl hexamethylenediamine.

Other tertiary amine gel catalysts which are useful in embodiments of the invention are the organic acid blocked aliphatic, alicyclic or heterocyclic tertiary amine catalysts known in the art to catalyze the isocyanate-polyol reaction. Some of these tertiary amines having the general formulas:

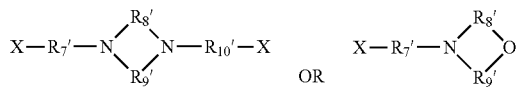

wherein $R_7'$ and $R_{10}'$ are each independently a branched or unbranched $C_1$ to $C_{10}$ methylene groups, preferably $C_1$-$C_3$ methylene groups, or wherein $R_7'$ and $R_{10}'$ may be connected to each other to form a closed ring having 2 to 6 carbon atoms between the nitrogens; and $R_8'$ and $R_9'$ are each independently a branched or unbranched $C_1$ to $C_6$ methylene groups; the bonds across the N or O atoms and the $R_8'$ or $R_9'$ groups are single or double; X is hydrogen or

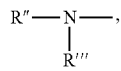

wherein R''' and R'''' are each independently a branched or unbranched $C_1$ to $C_6$ alkyl radical, such as a methyl or ethyl radical, and wherein R' and R'' may be optionally connected to each other through an oxygen or a substituted tertiary nitrogen to form a closed ring having 2 to 6 carbon atoms.

Suitable organic acid blocked amine gel catalysts are the acid blocked amines of triethylenediamine, N-ethyl or methyl morpholine, N,N dimethylaminoethyl morpholine, N-butylmorpholine, N,N' dimethylpiperazine, bis-(dimethylaminoalkyl)-piperazines, 1,2 dimethyl imidazole. Suitable tertiary amines within the invention which must be blocked with an organic acid are dimethyl benzylamine, tetramethylethylenediamine, and dimethyl cyclohexylamine.

Suitable acids used to block the gel catalysts may be the same as used to block the blowing catalysts. The gel catalyst may be dissolved in the same solvents as used to dissolve the blowing catalyst.

The total amount of blowing catalyst and gel catalyst in the polyol composition is that amount by weight effective to accelerate the reaction between the blowing agent(s)-polyols and the isocyanate. Generally, the total amount of blowing and gel catalysts range from 0.1 to 6.0 pbw, preferably 2.0 to 4.0 pbw, based on 100 pbw of the polyol component.

Examples of delayed action gel catalysts include DABCO 8154 catalyst based on 1,4-diazabicyclo[2.2.2]octane (available from Air Products and Chemicals, Inc), POLYCAT SA-1, POLYCAT SA-102, and POLYCAT SA-610/50 catalysts based on POLYCAT DBU amine catalyst (available from Air Products and Chemicals, Inc.), DABCO TMR-30, POLYCAT 1058 (available from Air Products and Chemicals, Inc.), TEGOAMIN AS 33 (available from Evonik Industries AG), and NIAX A-300 (available from Momentive Performance Materials).

In certain embodiments, the reaction system for the reaction of the mixtures of one or more polyols with at least one isocyanate may further include a blowing agent. In certain embodiments, the blowing agent content is from 1% to 5% by weight of the total weight of the reaction system. In certain embodiments, the blowing agent content is from 1% to 2% by weight of the total weight of the reaction system. In certain embodiments, the blowing agent is water.

Although no additional catalysts (other than the delayed action catalysts) in the foamable polyurethane composition is generally used, it is within the scope of the embodiments described herein to include one or more conventional catalysts. Catalysts are typically used in small amounts, for example, each catalyst being employed from 0.0015 to 5% by weight of the total reaction system. The amount depends on the catalyst or mixture of catalysts, the desired balance of the gelling and blowing reactions for specific equipment, the reactivity of the polyols and isocyanate as well as other factors familiar to those skilled in the art.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as Ti(OR)4, Sn(OR)4 and Al(OR)3, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N-dimethylaminoethyl, N,N,N', N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used.

Examples of commercially available amine catalysts include NIAX A1 and NIAX A99 (bis(dimethylaminoethyl) ether in propylene glycol available from Momentive Performance Materials), NIAX B9 (N,N-dimethylpiperazine and N—N-dimethylhexadecylamine in a polyalkylene oxide polyol, available from Momentive Performance Materials), DABCO 8264 (a mixture of bis(dimethylaminoethyl)ether, triethylenediamine and dimethylhydroxyethyl amine in dipropylene glycol, available from Air Products and Chemicals), DABCO 33LV (triethylene diamine in dipropylene glycol, available from Air Products and Chemicals), DABCO BL-11 (a 70% bis-dimethylaminoethyl ether solution in dipropylene glycol, available from Air Products and Chemicals, Inc; POLYCAT 58 (a proprietary amine catalyst available from Air Products and Chemicals), POLYCAT 5 (pentamethyl diethylene triamine, available from Air Products and Chemicals) and POLYCAT 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula SnRn(OR)4-n, wherein R is alkyl or aryl and n is 0-2, and the like. Organotin catalysts are generally used in conjunction with one or more tertiary amine catalysts, if used at all. Commercially available organotin catalysts of interest include KOSMOS 29 (stannous octoate from Evonik AG), DABCO T-9 and T-95 catalysts (both stannous octoate compositions available from Air Products and Chemicals).

In certain embodiments, the reaction system further comprises one or more surfactants to help stabilize the foam as it expands and cures. Surfactants are typically used in small amounts, for example, each catalyst being employed from about 0.0015 to about 5% by weight of the total reaction system. The amount depends on the surfactants or mixture of surfactants, as well as other factors familiar to those skilled in the art.

Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB (available from Evonik AG) B-8462, B-8404 and B-8871, and DC-198 and DC-5043 surfactants, available from Dow Corning, and NIAX L-627, NIAX L-620, and NIAX L-618 available from Momentive Performance Materials.

In a further embodiment, to improve processing and to permit the use of higher isocyanate indices, additional additives such as those described in publication WO 20008/021034, the disclosure of which is incorporated herein by reference, may be added to the reaction mixture. Such additives include 1) alkali metal or transition metal salts of carboxylic acids; 2) 1,3,5-tris alkyl- or 1,3,5-tris(N,N-dialkyl amino alkyl)-hexahydro-s-triazine compounds; and 3) carboxylate salts of quaternary ammonium compounds. When used, such additives are generally used in an amount from about 0.01 to 1 part per 100 total polyol. The additional additive is generally dissolved in at least one other component of the reaction mixture. It is generally not preferred to dissolve it in the polyisocyanate.

Various additional components may be included in the foam formulation. These include, for example, crosslinkers, plasticizers, fillers, smoke suppressants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

One or more crosslinkers are optionally present in the foam formulation. If used, amounts of crosslinkers used are preferably at least about 0.1, more preferably at least about 0.25, and preferably at most about 1, more preferably at most about 0.5 part by weight, per 100 parts by weight of total polyols.

"Crosslinkers" may be materials having three or more isocyanate-reactive groups per molecule and preferably an equivalent weight per isocyanate-reactive group of less than about 400. Crosslinkers may have at least about 3 and at most about 8 hydroxyl, primary amine or secondary amine groups per molecule and have an equivalent weight of at least about 30 or 50 and, independently at most about 125 or 200. Examples of suitable crosslinkers include diethanol amine, monoethanol amine, triethanol amine, mono- di- or tri(isopropanol)amine, glycerine, trimethylol propane, pentaerythritol, sorbitol and the like.

It is also possible to use one or more chain extenders in the foam formulation. A chain extender may be a material having two isocyanate-reactive groups per molecule and an equivalent weight per isocyanate-reactive group of less than about 400. The isocyanate reactive groups are preferably hydroxyl, primary aliphatic or aromatic amine or secondary aliphatic or aromatic amine groups. Representative chain extenders include amines ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene. If used, chain extenders are typically present in an amount of preferably at least about 1, more preferably at least about 3 and, independently preferably at most about 50, more preferably at most about 25 parts by weight per 100 parts by weight high equivalent weight polyol.

One or more fillers may also be present in the viscoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

Reactive particles may also be included in the reaction system to modify the properties of the foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227. When used, fillers advantageously constitute from about 0.5 to about 30%, especially about 0.5 to about 10%, by weight of the reaction system.

Although no additional blowing agent (other than the water) in the foamable polyurethane composition is generally used, it is within the scope of the embodiments described herein to include an auxiliary blowing agent. The auxiliary blowing agents can be, but are not limited to, liquid carbon dioxide ($CO_2$), supercritical $CO_2$ and various hydrocarbons, fluorocarbons, hydrofluorocarbons, chlorocarbons (such as methylene chloride), chlorofluorocarbons and hydrochlorofluorocarbons.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun.

It is known to produce sheets of foamed polyurethane for use as carpet backing, laminate lining in clothing, etc, by first producing blocks of foamed polyurethane in cylindrical shape and then peeling a sheet from the cylindrical blocks, thus reducing waste. Free rise cylindrical foam may be prepared by mixing the foam ingredients and dispensing them into a cylindrically shaped form and let the foam rise freely in the form. Typically, foams having a diameter of about 2 m, and a height of about 2.5 m are obtained in this manner.

The flexible low density polyurethane foams may be formed under vacuum (below atmospheric pressure) conditions as described in U.S. Pat. No. 6,372,812.

The low density polyurethane foams made as described herein have mechanical properties making them suitable for producing the peeled sheets of foamed polyurethane. The foams have acceptable mechanical properties such as tensile strength, tear strength, and elongation at break which helps prevent tearing of the polyurethane foam during the peeling process. At the same time, the foam has acceptable resiliency and compression set resulting in foams exhibiting little loss of initial height of the flexible polyurethane foams upon an outside force applied to the foams.

The resulting foams have densities below 35 kg/m³ as determined according to ASTM D 3574-01. All individual values and subranges below 35 kg/m³ are included herein and disclosed herein; for example, the density may be from a lower limit of 20, 21, 22, 23, 24, 25, 26, 27, 28, 29, or 30, to an upper limit of 26, 27, 28, 29, 30, 31 32, 33, 34, or 35 kg/m³.

The resulting foams may have a uniform density distribution along the heights of the foams. For example, the change in density per height meter may be less than about 2 kg/m³. All individual values and subranges of less than about 2 kg/m³ are included herein and disclosed herein; for example, the change in density per height meter may be less than about 0.6, 0.8, 1.0, 1.2, 1.4, 1.6, 1.8, or 2.0 kg/m³.

The resulting foams may have tensile strengths ranging from about 34 kPa to about 130 kPa as determined according to NBR 8515:2003. All individual values and subranges from about 34 kPa to about 130 kPa are included herein and disclosed herein; for example, the tensile strengths may be from a lower limit of 34, 35, 40, 45, 50, 55, 60, 70, 78, 80, 85, 90, 95, 97, 100, 105, 109, 110, 115, 120, or 125 kPa, to an upper limit of 50, 55, 60, 70, 78, 80, 85, 90, 95, 97, 100, 105, 109, 110, 115, 120, 125, or 130 kPa.

The resulting foams may have tear strengths ranging from about 160 N/m to about 380 N/m as determined according to NBR 8515:2003. All individual values and subranges from about 160 N/m to about 380 N/m are included herein and disclosed herein; for example, the tear strengths may be from a lower limit of 160, 166, 170, 173, 180, 190, 200, 205, 210, 212, 220, 230, 240, 249, 250, 260, 270, 280, 290, 300, 310, 320, 330, 340, 350, 360, 368, 370, or 376, N/m, to an upper limit of 170, 173, 180, 190, 200, 205, 210, 212, 220, 230, 240, 249, 250, 260, 270, 280, 290, 300, 310, 320, 330, 340, 350, 360, 368, 370, 376, or 380 N/m.

The resulting foams may exhibit an elongation to break ranging from about 120% to about 230% as determined according to NBR 8515:2003. All individual values and subranges from about 120% to about 230% are included herein and disclosed herein; for example, the elongation to break may be from a lower limit of 120, 125, 130, 132, 140, 150, 156, 160, 168, 170, 180, 185, 188, 190, 195, 200, 205, 208, or 210% to an upper limit of 130, 132, 140, 150, 156, 160, 168, 170, 180, 185, 188, 190, 195, 200, 205, 208, 210, 220, or 230%.

The resulting foams may exhibit resiliencies ranging from about 40% to about 65% as determined according to ASTM D-3574-H. All individual values and subranges from about 40% to about 65% are included herein and disclosed herein; for example, the resiliency may be from a lower limit of 40, 42, 45, 46, 47, 49, 50, 51, 52, 53, 55, 56, 57, 58, or 60% to an upper limit of 45, 46, 47, 49, 50, 51, 52, 53, 55, 56, 57, 58, 60, 61, 62, or 65%.

The resulting foams may exhibit 90% compression sets of 13% or lower as determined according to ASTM D 3574-03. All individual values and subranges of less than about 13% are included herein and disclosed herein; for example, the compression set may be from a lower limit of 2, 3, 4, 5, 6, 7, 8, 9, 10, 11, or 12%, to an upper limit of 3, 4, 5, 6, 7, 8, 9, 10, 11, 12, or 13%.

EXAMPLES

The following examples are provided to illustrate the embodiments of the invention, but are not intended to limit the scope thereof. All parts and percentages are by weight unless otherwise indicated.

The following materials are used:

| | |
|---|---|
| SPECFLEX* NC 630 | An about 1,810 equivalent weight polyoxyethylene capped polyoxypropylene polyol initiated with a blend of glycerol and sucrose, having nominal functionality of around 4.2, a polyoxyethylene capped percentage around 15.5%, a final primary OH percentage of around 79%, and a hydroxyl number of between 29.0 and 33.0. Available from The Dow Chemical Company. |
| VORANOL* CP 1421 | An about 1,675 equivalent weight polyoxyethylene/polyoxypropylene capped polyoxypropylene polyol initiated with glycerol, having nominal functionality of 3, a polyoxyethylene percentage around 78%, and a hydroxyl number of about 32. Available from The Dow Chemical Company. |
| VORANOL* CP 6001 | An about 2,040 equivalent weight polyoxyethylene capped polyoxypropylene polyol initiated with glycerol, having nominal functionality of 3, and a polyoxyethylene percentage around 15%. Available from The Dow Chemical Company. |
| VORANOL* 4053 | An about 1,795 equivalent weight polyoxyethylene capped polyoxypropylene polyol initiated with a blend of glycerol and sucrose, having nominal functionality of around 6.9, a polyoxyethylene capped percentage around 75. Available from The Dow Chemical Company. |

| | |
|---|---|
| VORANOL* WJ 4001 | An about 1,810 equivalent weight polyoxyethylene capped polyoxypropylene polyol initiated with a blend of glycerol and sucrose, having nominal functionality of around 4.2, a polyoxyethylene capped percentage around 15.5%, a final primary OH percentage of around 79%, and a hydroxyl number of between 29.0 and 33.0. Available from The Dow Chemical Company. |
| VORANOL* 3943A | A grafted polyether polyol containing copolymerized styrene and acrylonitrile, filtered to 100 microns in an about 1,030 equivalent weight polyoxyethylene/polyoxypropylene capped polyoxypropylene polyol initiated with glycerol, having nominal functionality of 3, and a polyoxyethylene percentage around 13%. Available from The Dow Chemical Company. |
| DEOA | Diethanolamine 85%, a crosslinker, available from Aldrich. |
| TEGOSTAB B 8681 | A silicone surfactant, commercially available from Evonik Industries. |
| TEGOSTAB B 4113 | A silicone surfactant, commercially available from Evonik Industries. |
| DABCO BL-17 | A delayed-action blowing catalyst; 70% acid-blocked bis(dimethylaminoethyl)ether and 30% dipropylene glycol available from Air Products and Chemicals, Inc. |
| NIAX A-400 | A tertiary amine delayed-action blowing catalyst available from Momentive Performance Materials. |
| DABCO 8154 | An acid blocked tertiary amine delayed-action gel catalyst available from Air Products and Chemicals, Inc. |
| TEGOAMIN AS 33 | A delayed-action gel catalyst available from Evonik Industries AG. |
| NIAX A-300 | A tertiary amine delayed-action gel catalyst available from Momentive Performance Materials. |
| DABCO T-12 | A conventional dibutyltin dilaurate gel catalyst available from Air Products and Chemicals, Inc. |
| DABCO 33-LV | A conventional gel catalyst, a 33% solution of triethylenediamine in propylene glycol available from Air Products & Chemicals Inc. |
| NIAX A-1 | A 70% bis(2dimethyl aminoethyl)ether and 30% dipropylene glycol catalyst available from Momentive Performance Materials. |
| DABCO T-9 | A stannous octoate catalyst available from Air Products & Chemicals Inc. |
| PAPI* 27 | A polymeric MDI (polymethylene polyphenylisocyanate) that contains MDI having a functionality of approximately 2.7, an isocyante equivalent weight of approximately 134 and an NCO content by weight of about 31.4%. Available from The Dow Chemical Company |
| PAPI* 94 | A polymeric MDI (polymethylene polyphenylisocyanate) that contains MDI having a functionality of approximately 2.3, an isocyante equivalent weight of approximately 131 and an NCO content by weight of about 32%. Available from The Dow Chemical Company |
| SPECFLEX* NE 134 | An MDI based prepolymer having a free NCO content of about 29.5%. Available from The Dow Chemical Company. |
| VORANATE* T-80 | A toluene diisocyanate (80% 2,4-toluene diisocyanate and 20% 2,6-toluene diisocyanate by weight) composition available from The Dow Chemical Company. |

*PAPI, SPECFLEX, VORANATE, and VORANOL are trademarks of The Dow Chemical Company.

Unless otherwise indicated, he following test methods are used:

Airflow: ASTM D 3574 G

Compression Set: ASTM D 3574-03

Density: ASTM D 3574-01

Indent Force Deflection: NBR 9176:2003*

Resiliency: ASTM D-3574-H Ball Rebound %

Tear Strength: NBR 8516:2003*

Tensile Strength: NBR 8515:2003*

Elongation: NBR 8515:2003*

Comfort factor: NBR 76:2003*

*NBR standards are issued by ABNT, Associação Brasileira de Normas Técnicas

Examples E1-E16 and Comparative Examples CE1-CE3

Polyurethane foams are prepared by combining the polyols, surfactants, water, and catalysts in the relative amounts in weight given in Table 1 (and Examples E1-E9) and Table 2 (Comparative Examples CE1-CE3 and Examples E10-E16). The isocyanate is then mixed in with the mixture and transferred to a 40 cm×40 cm×40 cm wooden box lined with plastic and left to rise freely.

As can be seen in Tables 1 and 2, even when the densities of the foams are low (from about 22 kg/m$^3$ (E14) to about 29 kg/m$^3$ (E3)) it can be seen that it is possible to obtain high elongation results (from about 120% (E3) to about 208% (E13)) and high tear resistance (from about 166 N/m (E12) to about 376 N/m (E6)). Furthermore, it can be seen that when substituting the MDI based isocyanate with a TDI based isocyanate (Comparative Example CE1), the foam collapses.

TABLE 1

| | E1 | E2 | E3 | E4 | E5 | E6 | E7 | E8 | E9 |
|---|---|---|---|---|---|---|---|---|---|
| SPECFLEX NC 630 | 90.0 | 90.0 | 90.0 | 90.0 | 90.0 | 90.0 | 90.0 | 90.0 | 90.0 |
| VORANOL CP 1421 | 10.0 | | 10.0 | | 10.0 | 10.0 | | 10.0 | 10.0 |
| VORANOL 4053 | | 10.0 | | 10.0 | | | 10.0 | | |
| Water | 5.0 | 5.0 | 5.0 | 5.0 | 5.0 | 5.0 | 5.0 | 5.0 | 5.0 |
| TEGOSTAB B 8681 | | 1.2 | 1.2 | 1.2 | 1.2 | | | 1.2 | 1.2 |
| TEGOSTAB B 4113 | 1.2 | | | | | 1.2 | 1.2 | | |
| NIAX A-1 | | | | | | | | | |
| DABCO BL-17 | | | 0.1 | 0.1 | | 0.1 | 0.1 | 0.1 | 0.1 |
| NIAX A-400 | 0.1 | 0.1 | | | 0.1 | | | | |
| DABCO 8154 | | | | | | | | | |
| TEGOAMIN AS 33 | | 0.7 | | | 0.7 | 0.7 | 0.7 | | |
| NIAX A-300 | 0.7 | | 0.7 | 0.7 | | | | 0.7 | 0.7 |
| DEOA | 1.0 | 1.0 | 1.0 | | | | 1.0 | 1.0 | 1.0 |
| DABCO T-12 | 0.2 | | | 0.2 | 0.2 | | 0.2 | | |
| SPECFLEX NE 134 | 73.0 | 73.0 | 82.1 | 73.0 | 82.1 | 73.0 | 82.1 | 82.1 | 82.1 |
| PAPI 94 | | | | | | | | | |
| Index | 80.0 | 80.0 | 90.0 | 80.0 | 90.0 | 80.0 | 90.0 | 90.0 | 90.0 |
| Density (kg/m$^3$) | 25.0 | 26.0 | 29.0 | 27.0 | 22.0 | 28.0 | 25.0 | 28.0 | 26.0 |
| Air Flow (cfm) | 4.5 | 1.5 | 1.4 | 0.7 | 2.5 | 2.5 | 4.7 | 1.4 | 1.4 |
| Tensile Strength (kPa) | 65.0 | 80.0 | 96.0 | 109.0 | 78.0 | 97.0 | 85.0 | 84.0 | 100.0 |
| Elongation (%) | 140.0 | 132.0 | 120.0 | 180.0 | 160.0 | 156.0 | 180.0 | 168.0 | 188.0 |
| Tear Strength (N/m) | 270.0 | 283.0 | 249.0 | 309.0 | 368.0 | 376.0 | 317.0 | 253.0 | 289.0 |
| IFD 25% (N) | 23.0 | 33.0 | 51.0 | 51.0 | 39.0 | 41.0 | 22.0 | 46.0 | 44.0 |
| IFD 40% (N) | 40.0 | 51.0 | 86.0 | 76.0 | 60.0 | 69.0 | 41.0 | 73.0 | 71.0 |
| IFD 65% (N) | 105.0 | 126.0 | 221.0 | 171.0 | 149.0 | 183.0 | 118.0 | 174.0 | 170.0 |
| Resiliency (%) | 50.0 | 51.0 | 56.0 | 45.0 | 45.0 | 58.0 | 49.0 | 52.0 | 52.0 |
| Compression Set 90% (%) | 3.0 | 8.0 | 6.0 | 80.0 | 8.0 | 7.0 | 13.0 | 5.0 | 11.0 |
| Comfort Factor | 4.6 | 3.8 | 4.3 | 3.4 | 3.8 | 4.5 | 5.4 | 3.8 | 3.9 |

TABLE 2

| | CE1 | E10 | E11 | E12 | E13 | E14 | CE2 | E15 | CE3 | E16 |
|---|---|---|---|---|---|---|---|---|---|---|
| SPECFLEX NC 630 | 90.0 | 90.0 | 90.0 | 90.0 | 90.0 | 90.0 | 90.0 | 90.0 | 90.0 | |
| VORANOL CP 1421 | 10.0 | 10.0 | 10.0 | 10.0 | 10.0 | 10.0 | 10.0 | 10.0 | 10.0 | 10.0 |
| VORANOL CP 6001 | | | | | | | | | | 90.0 |
| Water | 5.0 | 5.0 | 5.0 | 5.0 | 5.0 | 5.0 | 5.0 | 5.0 | 5.0 | 5.0 |
| TEGOSTAB B 4113 | 1.2 | 1.2 | 1.2 | 1.2 | 1.2 | 1.2 | 1.2 | 1.2 | 1.2 | 1.2 |
| NIAX A-1 | | | 0.1 | | 0.1 | | 0.1 | | 0.1 | |
| NIAX A-400 | 0.1 | 0.1 | | 0.1 | | 0.1 | | 0.1 | | 0.1 |
| DABCO 33-LV | | | 0.7 | 0.7 | | 0.7 | | 0.7 | | |
| TEGOAMIN AS 33 | 0.7 | 0.7 | 0.7 | | | 0.7 | | 0.7 | | 0.7 |
| DEOA | 1.0 | 1.0 | 1.0 | 1.0 | 1.0 | 1.0 | 1.0 | 1.0 | 1.0 | 1.0 |
| DABCO T-12 | 0.2 | 0.2 | 0.2 | 0.2 | 0.2 | 0.2 | 0.2 | 0.2 | 0.2 | 0.2 |
| SPECFLEX NE 134 | | 82.1 | 82.1 | 82.1 | 82.1 | | | | | 82.1 |
| PAPI 94 | | | | | | 80.6 | 80.6 | | | |
| PAPI 27 | | | | | | | | 76.8 | 76.8 | |
| VORANATE T-80 | 50.2 | | | | | | | | | |
| Index | 90.0 | 90.0 | 90.0 | 90.0 | 90.0 | 90.0 | 90.0 | 90.0 | 90 | 90.0 |
| Density (kg/m$^3$) | † | 23.4 | 24.0 | 24.3 | 23.9 | 22.3 | 20.5 | 26.4 | † | 22.8 |
| Air Flow (cfm) | † | 3.1 | 2.9 | 3.1 | 2.6 | 4.2 | 4.3 | 2.9 | † | 2.8 |
| Tensile Strength (kPa) | † | 52.1 | 55.4 | 38.4 | 49.1 | 35.9 | 34 | 41.1 | † | 49.3 |
| Elongation (%) | † | 195.4 | 188.2 | 185.5 | 207.9 | 137.1 | 106 | 125.0 | † | 151.1 |
| Tear Strength (N/m) | † | 212.2 | 198.0 | 166.1 | 192.1 | 166.6 | 173 | 194.2 | † | 205.4 |
| IFD 25% (N) | † | 27.0 | 24.0 | 12.0 | 10.0 | 15.0 | 27 | 46.0 | † | 12.0 |
| IFD 40% (N) | † | 41.0 | 38.0 | 24.0 | 23.0 | 30.0 | 40 | 71.0 | † | 23.0 |
| IFD 65% (N) | † | 106.0 | 106.0 | 77.0 | 82.0 | 95.0 | 89 | 163.0 | † | 57.0 |
| Resiliency (%) | † | 49.0 | 49.0 | 48.0 | 46.0 | 46.0 | 40 | 45.0 | † | 53.0 |
| Compression Set 90% (%) | † | 6.5 | 8.7 | 7.1 | 12.5 | 10.9 | 83.7 | 10.4 | † | 7.6 |
| Comfort Factor | † | 3.9 | 4.4 | 6.4 | 8.2 | 6.3 | 3.3 | 3.5 | † | 4.8 |

† Foam collapse, no physical measurements are performed.

Examples E17 and E18 and Comparative Examples CE4 and CE5

Polyurethane foams are prepared by combining the polyols, surfactants, water, and catalysts in the relative amounts in weight given in Table 3. The mixture is then reacted with an isocyanate in a Cannon low pressure continuous foaming machine to form a free rise foam having a height of 1 m.

The formulations for Examples E17 and E18 and Comparative Examples CE4 and CE5 are formulated to produce low density high resiliency high tear strength foams. Examples E17 and E18 are MDI based formulations incorporating delayed action catalysts, while the Comparative Examples CE4 and CE5 are optimized TDI based formulations.

For Examples E17 and E18 and Comparative Examples CE4 and CE5 samples (40×40×10 cm) are obtained from the bottom, middle, and top of the foams. As can be seen, the foams of Examples E17 and E18 have density variations from bottom to top of 1.6 and 0.7 respectively, while the density variation for Comparative Examples CE4 and CE5 are at least two to five times greater. Due to the very good density distribution, the foam of Example E18 can be used to produce high resiliency foam buns of at least up to 2.2 meters height.

While the foregoing is directed to embodiments of the present invention, other and further embodiments of the invention may be devised without departing from the basic scope thereof and the scope thereof is determined by the claims that follow.

TABLE 3

|  | E17 | E18 | CE4 | CE5 |
|---|---|---|---|---|
| VORANOL WJ 4001 | 90.00 | 90.00 | 60.0 | 60.0 |
| VORANOL 3943A |  |  | 37.0 | 37.0 |
| VORANOL CP 1421 | 10.00 | 10.00 | 3.0 | 3.0 |
| DEOA |  | 1.18 | 1.7 | 1.7 |
| Water | 5.00 | 4.82 | 2.4 | 2.4 |
| TEGOSTAB B 4113 | 1.20 | 1.20 |  |  |
| TEGOSTAB B 8681 |  |  | 0.5 | 0.5 |
| DABCO T-9 |  |  | 0.2 | 0.2 |
| DABCO 33-LV |  |  | 0.1 | 0.1 |
| NIAX A-1 |  |  | 0.1 | 0.1 |
| TEGOAMIN AS 33 | 0.70 | 0.70 |  |  |
| NIAX A-400 | 0.10 | 0.10 |  |  |
| ISOCYANATE INDEX | 90.00 | 90.00 | 112.0 | 108.0 |
| SPECFLEX NE 134 | 78.06 | 81.72 |  |  |
| VORANATE T-80 |  |  | 45.3 | 43.7 |

|  | E17 | | | E18 | | | CE4 | | | CE5 | | |
|---|---|---|---|---|---|---|---|---|---|---|---|---|
|  | Top | Middle | Bottom | Top | Middle | Bottom | Top | Middle | Bottom | Top | Middle | Bottom |
| Airflow - ft³/min - ASTM D 3574 G - Airflow | 3.0 | 2.4 | 2.3 | 2.8 | 2.1 | 2.4 | 2.2 | 1.9 | 1.7 | 2.8 | 2.2 | 1.9 |
| CS 50%, Original, Parallel - ASTM D 3574-03 CT % |  |  |  |  |  |  | 3.3 | 3.6 | 4.5 | 3.3 | 4.2 | 4.5 |
| CS 90%, Original, Parallel - ASTM D 3574-03 CT % | 8.5 | 7.9 | 9.2 | 6.0 | 6.4 | 7.3 |  |  |  |  |  |  |
| Density: ASTM D 3574-01 (kg/m³) | 31.3 | 32.4 | 32.9 | 29.9 | 30.3 | 30.6 | 30.1 | 31.4 | 33.7 | 30.4 | 32.6 | 33.9 |
| Density Variation (Top-Bottom) (kg/m³): |  | 1.6 |  |  | 0.7 |  |  | 3.6 |  |  | 3.5 |  |
| IFD: ASTM - IFD: ASTM D 3574-01 -Test B |  |  |  |  |  |  |  |  |  |  |  |  |
| Load @ 25% Deflection (lbf) | 27 | 26 | 23 | 20 | 19 | 19 | 29 | 33 | 35 | 29 | 29 | 30 |
| Load @ 65% Deflection (lbf) | 58 | 58 | 57 | 47 | 49 | 50 | 79 | 86 | 101 | 71 | 77 | 88 |
| Support Factor (%) | 2.2 | 2.2 | 2.4 | 2.4 | 2.6 | 2.7 | 2.7 | 2.6 | 2.9 | 2.5 | 2.7 | 2.9 |
| Resiliency ASTM D-3574-H Ball Rebound % | 60 | 59 | 61 | 62 | 61 | 60 | 55 | 58 | 61 | 57 | 59 | 61 |
| Tear Strength - ASTM D 3574-01 Test F (N/m) | 157 | 161 | 149 | 122 | 112 | 117 | 175 | 136 | 133 | 137 | 165 | 149 |

The invention claimed is:

1. A flexible polyurethane foam comprising the reaction product of a reaction system, wherein the reaction system comprises:
    at least one isocyanate component wherein at least 50% by weight of the isocyanate component comprises an methylene diphenylisocyanate based isocyanate;
    a polyol component that includes at least one first polyether polyol and at least one second polyether polyol,
        the at least one first polyether polyol having an equivalent weight of about 1000-2500, a combined nominal functionality of about 3 to about 6, wherein the at least one first polyether polyol is a polyoxyethylene capped polyoxypropylene polyol capped at a percentage of about 10-20%, and the at least one first polyether polyol comprises 50 wt % to 99 wt % based on the total amounts by weight of polyols used;
        the at least one second polyether polyol having an equivalent weight of about 1400-2000, a combined nominal functionality of about 2 to about 7.2, wherein the at least one second polyol is a polyoxyethylene/polyoxypropylene capped polyoxypropylene polyol having a polyoxyethylene percentage 60 wt % to 85 wt %, and the at least one second polyol comprises 1 wt % to 30 wt % based on the total amounts by weight of polyols used; and
    at least one delayed action gel catalyst and at least one delayed action blowing catalyst,
    wherein the flexible polyurethane foam has a density of less than about 33 kg/m³ as determined according to ASTM D 3574-01 and a resiliency of at least 45% as measured according to ASTM D 3574-H Ball Rebound.

2. The flexible polyurethane foam of claim 1, further having a 90% compression set of less than about 13% as determined by ASTM D 3574-03.

3. The flexible polyurethane foam of claim 2, further having an elongation to break of more than about 120% as determined according to NBR 8515:2003.

4. The flexible polyurethane foam of claim 3, further having an tensile strength of more than about 34 kPa as determined according to NBR 8515:2003.

5. The flexible polyurethane foam of claim 1, wherein the foam has a change in density per height meter of less than about 2 kg/m3.

6. The flexible polyurethane foam of claim 1, wherein the methylene diphenylisocyanate based isocyanate comprises a mixture of 4,4'- and 2,4'-methylene diphenylisocyanate in weight ratios from 98:2 to 60:40.

7. The flexible polyurethane foam of claim 1, wherein the MDI based isocyanate comprises an admixture of polymeric polymethylene polyphenylisocyanate and 4,4'- and 2,4'-methylene diphenylisocyanate.

8. The flexible polyurethane foam of claim 1, wherein the MDI based isocyanate comprises at least one isocyanate-terminated prepolymer that is obtained by reacting MDI with at least one polyoxyalkylene polyol having an average nominal functionality from about 2 to about 4.

9. The flexible polyurethane foam of claim 1, wherein the delayed action gel catalyst is blocked with an organic carboxylic acid or a phenol prior to admixture with the polyol component.

10. The flexible polyurethane foam of claim 1, wherein the delayed action blowing catalyst is blocked with an organic carboxylic acid or a phenol prior to admixture with the polyol component.

11. The flexible polyurethane foam of claim 1, wherein the delayed action gel catalyst is an organic acid blocked tertiary amine catalyst.

12. The flexible polyurethane foam of claim 1, wherein the delayed action blowing catalyst is a carboxylic acid blocked tertiary amine catalyst.

\* \* \* \* \*